(12) United States Patent
Choi et al.

(10) Patent No.: US 11,671,659 B2
(45) Date of Patent: Jun. 6, 2023

(54) IMAGE DISPLAY APPARATUS AND METHOD THEREOF

(71) Applicant: LG ELECTRONICS INC., Seoul (KR)

(72) Inventors: Yookyoung Choi, Seoul (KR); Jeean Chang, Seoul (KR); Jaekyung Lee, Seoul (KR); Sangseok Lee, Seoul (KR); Jinhyuck Kwon, Seoul (KR); Yeongbin Byeon, Seoul (KR); Jeungrac Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/307,420

(22) Filed: May 4, 2021

(65) Prior Publication Data

US 2021/0352367 A1    Nov. 11, 2021

(30) Foreign Application Priority Data

May 6, 2020    (KR) ......................... 10-2020-0054009

(51) Int. Cl.
*H04N 21/442* (2011.01)
*H04N 21/431* (2011.01)
*H04N 21/4223* (2011.01)

(52) U.S. Cl.
CPC ... *H04N 21/44222* (2013.01); *H04N 21/4223* (2013.01); *H04N 21/4312* (2013.01)

(58) Field of Classification Search
None
See application file for complete search history.

(56) References Cited

U.S. PATENT DOCUMENTS

| | | | |
|---|---|---|---|
| 2004/0078816 A1* | 4/2004 | Johnson | H04N 21/482 725/52 |
| 2006/0020973 A1* | 1/2006 | Hannum | H04N 21/252 725/46 |
| 2006/0064716 A1* | 3/2006 | Sull | G06F 16/784 715/201 |
| 2007/0033616 A1* | 2/2007 | Gutta | H04N 21/4402 348/E5.002 |
| 2008/0276277 A1* | 11/2008 | Ahn | H04N 21/466 725/40 |

(Continued)

*Primary Examiner* — Alexander Q Huerta
(74) *Attorney, Agent, or Firm* — Lee Hong Degerman Kang Waimey

(57) ABSTRACT

The present disclosure relates to an image display apparatus and a method thereof. The image display apparatus according to an embodiment of the present disclosure comprises: a display; a network interface configured to communicate with a server; a broadcast reception unit including a tuner; a memory; and a controller, wherein the controller is configured to: add information on the content displayed through the display to a viewing history database stored in the memory when content is displayed through the display, determine a priority for a plurality of receivable content through at least one of the network interface and the broadcast receiving unit based on the viewing history database when a predetermined event related to a user's content viewing occurs, and display, through the display, a recommendation list for the plurality of receivable content according to the determined priority.

8 Claims, 13 Drawing Sheets

(56) References Cited

U.S. PATENT DOCUMENTS

| | | | |
|---|---|---|---|
| 2009/0133051 A1* | 5/2009 | Hildreth | H04N 21/4223 725/28 |
| 2009/0260035 A1* | 10/2009 | Yang | H04N 21/47 725/44 |
| 2011/0047568 A1* | 2/2011 | Yeh | H04N 21/4532 725/38 |
| 2012/0054679 A1* | 3/2012 | Ma | H04N 21/4826 715/810 |
| 2013/0179520 A1* | 7/2013 | Lee | H04L 51/32 709/206 |
| 2013/0247101 A1* | 9/2013 | Uchida | H04N 21/4223 725/40 |
| 2014/0082655 A1* | 3/2014 | Moon | H04N 21/4622 725/27 |
| 2015/0269969 A1* | 9/2015 | DeYonker | H04N 21/47 386/241 |
| 2016/0105721 A1* | 4/2016 | Eldering | H04N 21/482 725/14 |
| 2017/0188096 A1* | 6/2017 | Wickenkamp | H04N 21/44226 |
| 2017/0264931 A1* | 9/2017 | Wheatley | H04N 21/25891 |
| 2018/0124463 A1* | 5/2018 | Seo | G06F 3/04842 |
| 2019/0325079 A1* | 10/2019 | Blake | G06F 16/3344 |
| 2020/0413149 A1* | 12/2020 | Bryant | H04N 21/44008 |

\* cited by examiner

US 11,671,659 B2

IMAGE DISPLAY APPARATUS AND METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2020-0054009, filed on May 6, 2020, the contents of which is hereby incorporated by reference herein in its entirety.

BACKGROUND OF THE INVENTION

Field of the Disclosure

The present disclosure relates to an image display apparatus and method thereof.

Description of the Related Art

An image display apparatus is an apparatus having a function of displaying an image that can be watched by a user, and the user can watch a broadcast through the image display apparatus. For example, the image display apparatus may include a Television TV having a liquid crystal display LCD using liquid crystal or an OLED display using an organic light emitting diode OLED.

In recent years, digital TV services using wired or wireless communication networks are becoming more common, and digital TV services provide a variety of services that cannot be provided by conventional analog broadcasting services. In particular, as the amount of TV broadcast content or web content provided by Internet Protocol Television (IPTV), Smart TV, and the like has recently increased, users are likely to experience inconvenience in selecting content to watch from among numerous content.

In order to solve the user's inconvenience in selecting such content, a content provider (CP) has conventionally recommended the latest content or popular content that other users have watched a lot, or web content related to TV broadcasting content currently being watched by the user are recommended. However, content recommended through the conventional method are often slightly different from the user's preference.

When an external server collects a user's usage history for the image display apparatus and wants to recommend content to the user based on the usage history collected by the external server, a user's consent to provide personal information is generally required. In addition, if the user does not agree to a provision of information for reasons such as concerns about leakage of personal information, there is a problem in that the user is not recommended at all for content that meets their preferences.

In addition, when the user logs in to a service related to content viewing, for example, an OTT (Over the Top) service and views the content, the content provider may recommend content that meets the user's preferences based on a user's viewing history if collection of the user's viewing history of the logged in user is permitted. However, even in this situation, a company providing the OTT service can only collect the user's viewing history of the logged-in user, and thus, if the user is not logged in to the service, there is a problem in that the user cannot recommend content that meets their preferences.

In addition, the company providing the OTT service cannot check the user's viewing history related to broadcasting content such as terrestrial broadcasting, cable broadcasting, or other OTT services, and thus, an accuracy of recommending content recommended to the user may be insufficient. In addition, when a plurality of users use the image display apparatus such as a TV installed in a home, it is also necessary to recommend content suitable for each of the plurality of users.

SUMMARY

It is an object of the present disclosure to solve the above and other problems.

It is another object of the present disclosure to provide an image display apparatus and method thereof that may constantly more quickly and accurately recommend content that is likely to be preferred by a user without worrying about personal information leakage, based on a user's viewing history of the user who has watched content in various ways through the image display apparatus.

It is another object of the present disclosure to provide an image display apparatus and method thereof that may more quickly and accurately recommend content desired by each of a plurality of users.

In accordance with an aspect of the present disclosure, an image display apparatus may comprise: a display; a network interface configured to communicate with a server; a broadcast reception unit including a tuner; a memory; and a controller configured to: when content is displayed through the display, add information on the content displayed through the display to a viewing history database stored in the memory; determine a priority for a plurality of receivable content through at least one of the network interface and the broadcast receiving unit based on the viewing history database when a predetermined event related to a user's content viewing occurs; and display, through the display, a recommendation list for the plurality of receivable content according to the determined priority.

Furthermore, the information on the content may include at least one of a title, a genre, a content provider, a broadcast channel, an application, a provision date of the content, a broadcasting time of the content, and a viewing time of the content.

Furthermore, the controller may be configured to add the information on the content displayed through the display to the viewing history database when the content is displayed for a predetermined time or longer.

Furthermore, the controller may be configured to: receive information on the plurality of receivable content from the server through the network interface when the predetermined event occurs; and compare the information on the plurality of receivable content with the information on the content included in the viewing history database to determine the priority for the plurality of receivable content.

Furthermore, image display apparatus may comprise a camera, wherein the controller is configured to: acquire a surrounding image associate with surroundings of the image display apparatus through the camera when the predetermined event occurs; and when at least one object corresponding to a user is included in the acquired surrounding image, determine the priority for the plurality of receivable content based on features of the object corresponding to the user, wherein the features of the object corresponding to the user include gender and age.

Furthermore, the controller may be configured to: acquire the surrounding image when content is displayed through the display; map the information on the content displayed through the display with the features of the object corresponding to the user; and add the mapped information to the viewing history database.

Furthermore, the controller may be configured to: identify content providers of the plurality of receivable content; determine, based on the viewing history database, a first content provider having the highest number of cumulative views among the identified content providers; and determine a priority of content provided by the first content provider higher than that of other content providers.

Furthermore, the controller may be configured to: display, through the display, an item corresponding to an application related to the first content provider together with the recommendation list; and execute the application related to the first content provider when the item is selected.

Furthermore, the controller may be configured to: when displaying the recommendation list, display thumbnail images for a predetermined number of content having a high priority among the plurality of content; and display a preset basic image for content other than the content having the high priority.

Furthermore, the controller may be configured to: to change, when one of the basic images is selected, the selected basic image to a thumbnail image of content corresponding to the selected basic image.

In accordance with an aspect of the present disclosure, a method of an image display apparatus is provided. The method comprises: when content is displayed through a display of the image display apparatus, adding information on the content displayed through the display to a viewing history database stored in a memory of the image display apparatus; when a predetermined event related to a user's content viewing occurs, determining a priority for a plurality of receivable content through at least one of a network interface and a broadcast receiving unit of the image display apparatus based on the viewing history database; and displaying, through the display, a recommendation list for the plurality of receivable content according to the determined priority.

According to the present disclosure, the image display apparatus and method thereof have the following effects.

According to various embodiments of the present disclosure, contents that are highly likely to be preferred by the user may be preferentially recommended in consideration of various recommendation factors such as genre, title, channel, a viewing time period, and a content provider of contents viewed by the user through the image display apparatus, such that the user's convenience regarding content selection is improved.

Furthermore, according to various embodiments of the present disclosure, a user's viewing history corresponding to content displayed in various ways through the image display apparatus may be collected and managed in an internal database of the image display apparatus, such that content that is highly likely to be preferred by users may be recommended, regardless of log-in to a specific service, without worrying about leakage of personal information.

Furthermore, according to various embodiments of the present disclosure, not only the user's viewing history but also the characteristics of the user using a camera provided in the image display apparatus may be checked, such that content suitable for each of a plurality of users may be recommended more quickly and accurately.

The additional range of applicability of the present disclosure will become apparent from the following detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

DESCRIPTION OF EXEMPLARY EMBODIMENTS

Figure 1:
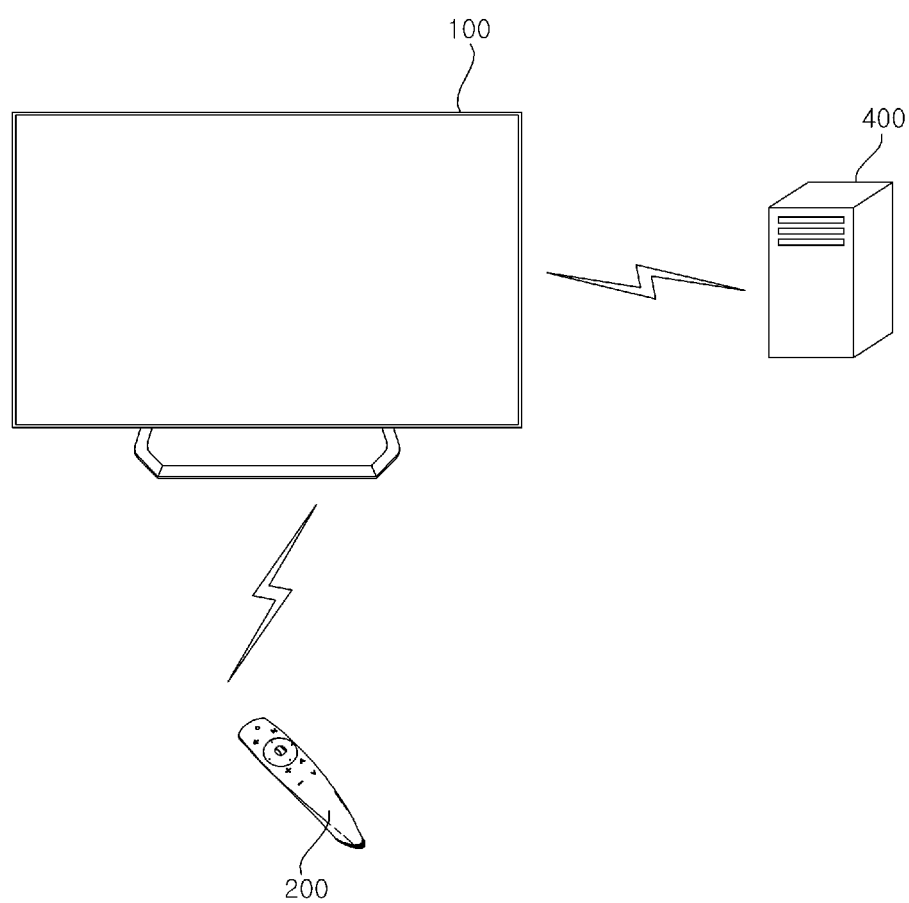
FIG. 1 is a diagram illustrating an image display system according to an embodiment of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and the "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

FIG. 1 is a diagram illustrating an image display system according to an embodiment of the present disclosure.

Referring to FIG. 1, an image display system 10 may include an image display apparatus 100 and/or a remote control device 200.

The image display apparatus 100 may be an apparatus that processes and outputs an image. The image display apparatus 100 is not particularly limited such as a TV, a notebook computer, a monitor, and the like as long as it can output a screen corresponding to an image signal/

The image display apparatus 100 may receive a broadcast signal, signal-process the broadcast signal, and output a signal-processed broadcast image. When the image display apparatus 100 receives a broadcast signal, the image display apparatus 100 may correspond to a broadcast reception device.

The image display apparatus 100 may receive a broadcast signal wirelessly through an antenna, or may receive a broadcast signal by wire through a cable. For example, the image display apparatus 100 may receive a terrestrial broadcast signal, a satellite broadcast signal, a cable broadcast signal, an Internet Protocol Television (IPTV) broadcast signal, and the like.

The remote control device 200 may be connected to the image display apparatus 100 by wire and/or wirelessly to provide various control signals to the image display apparatus 100. At this time, the remote control device 200 may include a device that establishes a wired or wireless network with the image display apparatus 100 and transmits various control signals to the image display apparatus 100 through the established network, or receives a signal related to various operations processed by the image display apparatus 100 from the image display apparatus 100.

For example, various input devices, such as a mouse, a keyboard, a space remote controller, a trackball, a joystick, and the like may be used as the remote control device 200. The remote control device 200 may be referred to as an external device, and hereinafter, it should be noted that an external device and a remote control device can be mixed and used, if necessary.

The image display apparatus 100 may be connected to only a single remote control device 200, or connected to two or more remote control devices 200 at the same time, and may change the object displayed on a screen or adjust the state of the screen, based on a control signal provided from each remote control device 200.

Meanwhile, the image display system 10 may further include at least one server 400. The image display apparatus 100 may transmit and receive data between the server 400 and each other. For example, the image display apparatus 100 may transmit and receive data to and from the server 400 through a network such as the Internet.

The image display apparatus 100 may transmit data related to an operation performed according to a user input to the server 400, and the server 400 may store data received from the image display apparatus 100.

Figure 2:
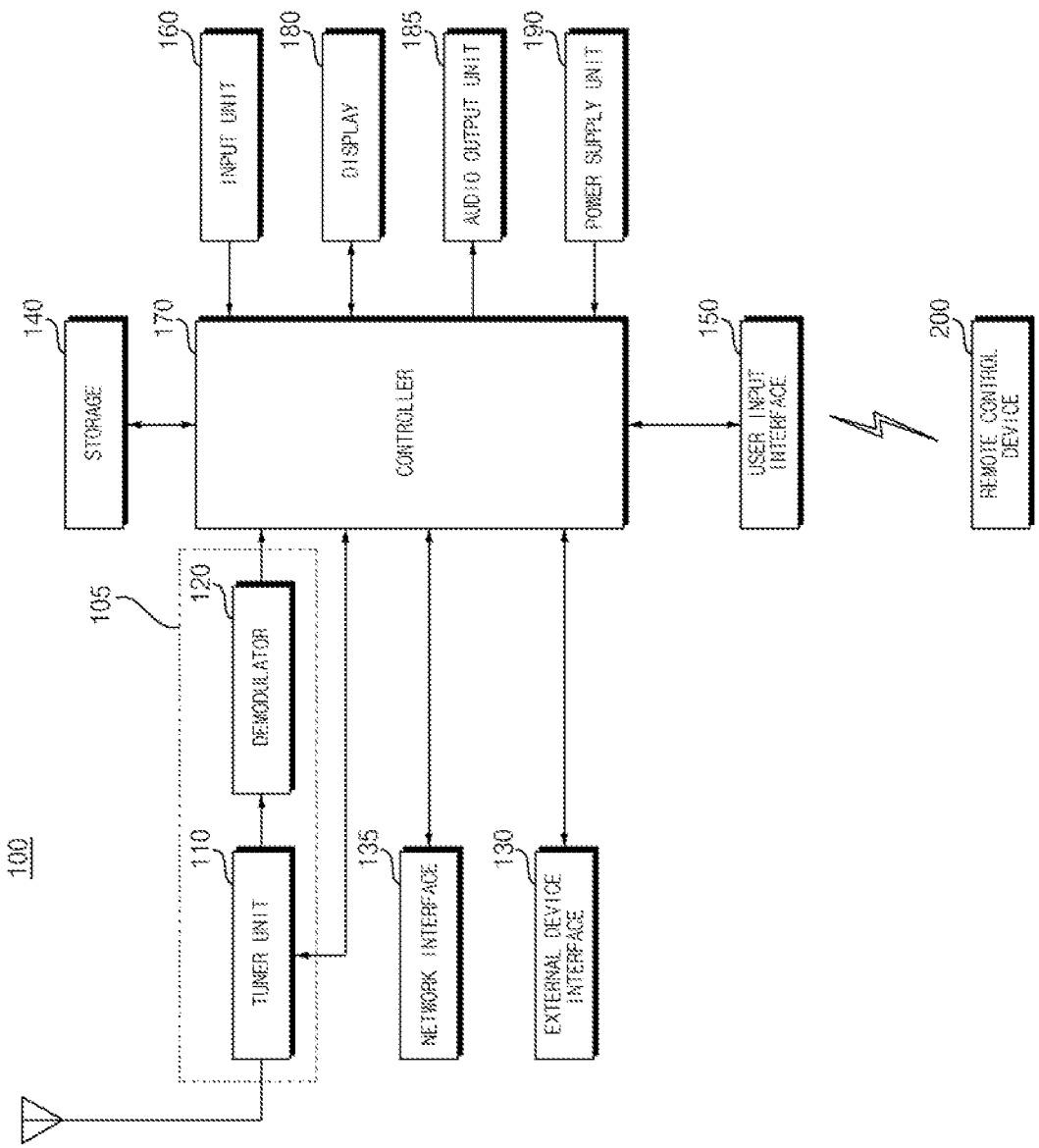
FIG. 2 is an internal block diagram of the image display apparatus of FIG. 1.

FIG. 2 is an internal block diagram of the image display apparatus of FIG. 1.

Referring to FIG. 2, the image display apparatus 100 may include a broadcast reception unit 105, an external device interface 130, a network interface 135, a storage unit 140, a user input interface 150, an input unit 160, a controller 170, a display 180, an audio output unit 185 and/or a power supply unit 190.

The broadcast reception unit 105 may include a tuner 110 and a demodulation unit 120.

Meanwhile, unlike the drawing, it is also possible that the image display apparatus 100 includes only the broadcast reception unit 105, and the external device interface 130, among the broadcast reception unit 105, the external device interface 130, and the network interface 135. That is, the image display apparatus 100 may not include the network interface 135.

The tuner 110 may select a broadcast signal corresponding to a channel selected by a user or all previously stored channels from among broadcast signals received through an antenna or a cable. The tuner 110 may convert the selected broadcast signal into an intermediate frequency signal, a baseband image, or an audio signal.

For example, if the selected broadcast signal is a digital broadcast signal, the tuner 110 may convert the digital broadcast signal into a digital IF signal (DIF). If the selected broadcast signal is an analog broadcast signal, the tuner 110 may convert the analog broadcast signal into an analog baseband image or audio signal (CVBS/SIF). That is, the tuner 110 may process a digital broadcast signal or an analog broadcast signal. The analog baseband image or audio signal (CVBS/SIF) output from the tuner 110 may be directly input to the controller 170.

Meanwhile, the tuner 110 may sequentially select broadcast signals of all broadcast channels stored through a channel memory function among received broadcast signals, and convert the broadcast signals into an intermediate frequency signal, a baseband image, or an audio signal.

Meanwhile, the tuner 110 may include a plurality of tuners in order to receive broadcast signals of a plurality of channels. Alternatively, a single tuner that simultaneously receives broadcast signals of multiple channels may be provided.

A demodulation unit 120 may perform a demodulation operation by receiving the digital IF signal DIF converted by the tuner 110.

The demodulation unit 120 may output a stream signal TS after performing demodulation and channel decoding. In this situation, the stream signal may be a signal which is obtained by multiplexing an image signal, an audio signal, or a data signal.

The stream signal output from the demodulation unit 120 may be input to the controller 170. After performing demultiplexing, image/audio signal processing, and the like, the controller 170 may output an image through the display 180 and output an audio through the audio output unit 185.

The external device interface 130 may transmit or receive data with a connected external device. To this end, the external device interface 130 may include an A/V input/output unit.

The external device interface 130 may be connected to an external device such as a digital versatile disk (DVD), a Blu ray, a game device, a camera, a camcorder, a computer (laptop), a set-top box, and the like by wire/wireless, and may perform input/output operations with the external device.

In addition, the external device interface 130 communicates with various remote control device 200 as shown in FIG. 1, and may receive a control signal related to the operation of the image display apparatus 100 from the remote control device 200, or may transmit data related to the operation of the image display apparatus 100 to the remote control device 200.

An A/V input/output unit may receive image and audio signals from an external device. For example, the A/V input/output unit may include an Ethernet terminal, a USB terminal, CVBS (Composite Video Banking Sync) terminal, component terminal, S-video terminal (analog), DVI (Digital Visual Interface) terminal, HDMI (High Definition Multimedia Interface) terminal, MHL (Mobile High-definition Link) terminal, RGB terminal, D-SUB terminal, IEEE 1394 terminal, SPDIF terminal, Liquid HD terminal, and the like. Digital signals input through these terminals may be transmitted to the controller 170. In this situation, the analog signal input through the CVBS terminal and the S-video terminal may be converted into a digital signal through an analog-digital converter and transmitted to the controller 170.

The external device interface 130 may include a wireless communication unit for short-range wireless communication with other electronic device. Through such a wireless communication unit, the external device interface 130 may exchange data with an adjacent mobile terminal. In particular, in a mirroring mode, the external device interface 130 may receive device information, executed application information, application images, and the like from the mobile terminal.

The external device interface 130 may perform short-range wireless communication using Bluetooth, Radio Frequency Identification (RFID), Infrared communication (IrDA, infrared Data Association), UWB (Ultra-Wideband), ZigBee, or the like.

The network interface 135 may provide an interface for connecting the image display apparatus 100 to a wired/wireless network including an Internet network.

Meanwhile, the network interface 135 may include a communication module for connection with a wired/wireless network. For example, the network interface 135 may include a communication module for wireless LAN (WLAN) (Wi-Fi), wireless broadband (Wibro), Wimax (World Interoperability for Microwave Access), HSDPA (High Speed Downlink Packet Access), or the like.

The network interface 135 may transmit or receive data with other users or other electronic devices through a connected network or another network linked to the connected network.

The network interface 135 may receive web content or data provided by a content provider or a network operator. That is, the network interface 135 may receive content such as movies, advertisements, games, VODs, broadcasts, and related information provided from the content provider or the network provider through the network. \

The network interface 135 may receive update information and an update file of firmware provided by the network operator, and may transmit data to the content provider or the network operator.

The network interface 135 may select and receive a desired application from among applications open to the public through the network.

The storage unit 140 may store a program for processing and controlling each signal in the controller 170 or may store a signal-processed image, audio, or data signal. For example, the storage unit 140 may store application programs designed for performing various tasks that can be processed by the controller 170, and may provide some of the stored application programs selectively when requested by the controller 170.

Program, or the like stored in the storage unit 140 is not particularly limited as long as they can be executed by the controller 170.

The storage unit 140 may store a database (hereinafter, a viewing history database) including information on content watched by a user. Here, the content is a variety of content that can be provided to a user through the image display apparatus 100, such as broadcast content corresponding to the broadcast signal received through the broadcast reception unit 105 or web content received through the network interface 135. In addition, the information on the content may include a title, a genre, a content provider, a broadcast channel, an application, a broadcasting time, a viewing time zone, a viewing date, a content rating, and the like.

In this situation, the viewing history database may include a plurality of sub-databases. For example, the viewing history database may include a sub-database for each genre, a sub-database for each content provider, a sub-database for each broadcasting channel, a sub-database for each viewing time period, a sub-database for each user, and a sub-database for each OTT service.

The storage unit 140 may perform a function for temporary storage of an image, audio, or data signal received from an external device through the external device interface 130.

The storage unit 140 may store information on a certain broadcast channel, through a channel storage function such as a channel map.

FIG. 2 illustrates an embodiment in which the storage unit 140 is provided separately from the controller 170, but the scope of the present disclosure is not limited thereto, and the storage unit 140 may be included in the controller 170.

The storage unit 140 may include at least one of volatile memory (e.g. DRAM, SRAM, SDRAM, etc.), and nonvolatile memory (e.g. flash memory, hard disk drive HDD, and solid-state drive SSD, etc.). In various embodiments of the present disclosure, the storage unit 140 and a memory may be used interchangeably.

The user input interface 150 may transmit a signal input by the user to the controller 170, or may transmit a signal from the controller 170 to the user.

For example, the user input interface 150 may transmit/receive a user input signal such as power on/off, channel selection, and screen setting from the remote control device 200, transmit a user input signal input from a local key such as a power key, a channel key, a volume key, and a setting key to the controller 170, transmit a user input signal input from a sensor unit that senses a user's gesture to the controller 170, or transmit a signal from the controller 170 to a sensor unit.

The input unit 160 may be provided in one side of the main body of the image display apparatus 100. For example, the input unit 160 may include a touch pad, a physical button, or the like.

The input unit 160 may receive various user commands related to the operation of the image display apparatus 100, and may transmit a control signal corresponding to the input command to the controller 170.

The input unit 160 may include at least one microphone, and may receive a user's voice through the microphone.

The controller 170 may include at least one processor, and may control the overall operation of the image display apparatus 100 by using the processor included therein. Here, the processor may be a general processor such as a central processing unit (CPU). Obviously, the processor may be a dedicated device such as an ASIC or another hardware-based processor.

The controller 170 may demultiplex the stream input through the tuner 110, the demodulation unit 120, the external device interface 130, or the network interface 135, or may generate and output a signal for image or audio output by processing demultiplexed signals.

The display 180 may generate a driving signal by converting the data signal, the OSD signal, the control signal, the image signal processed by the controller 170, or the data signal, the control signal, the image signal received from the external device interface 130, or the like.

The display 180 may include a display panel including a plurality of pixels.

A plurality of pixels provided in a display panel may include a RGB subpixel. Alternatively, a plurality of pixels included in a display panel may include a RGBW subpixel. The display 180 may generate a driving signal for a plurality of pixels, by converting the image signal, the data signal, the OSD signal, the control signal, and the like processed by the controller 170.

The display 180 may be a Plasma Display Panel (PDP), a Liquid Crystal Display (LCD), an Organic Light Emitting Diode (OLED), a flexible display, or the like and may also be a 3D display. The 3D display 180 may be classified into a glasses-free type and a glasses type.

Meanwhile, the display 180 may be configured as a touch screen and used as an input device in addition to an output device.

The audio output unit 185 receives an audio-processed signal from the controller 170 and outputs as an audio.

The image signal image-processed by the controller 170 may be input to the display 180 and displayed as an image corresponding to a pertinent image signal. In addition, the image signal image-processed by the controller 170 may be input to an external output device through the external device interface 130.

The audio signal processed by the controller 170 may be output as an audio to the audio output unit 185. In addition, the audio signal processed by the controller 170 may be transmitted to an external output device through the external device interface 130.

Although not shown in FIG. 2, the controller 170 may include a demultiplexer, an image processing unit, and the like. This will be described later with reference to FIG. 3.

In addition, the controller 170 may control the overall operation of the image display apparatus 100. For example, the controller 170 may control the tuner 110 to select (tune) a channel selected by a user or a broadcast corresponding to a previously stored channel.

In addition, the controller 170 may control the image display apparatus 100 according to a user command input through the user input interface 150 or an internal program.

Meanwhile, the controller 170 may control the display 180 to display an image. In this situation, the image displayed on the display 180 may be a still image or a moving image, and may be a 2D image or a 3D image.

Meanwhile, the controller 170 may display a certain 2D object within an image displayed on the display 180. For example, the object may be at least one of an accessed web screen (newspaper, magazine, etc.), an electronic program guide (EPG), various menus, widget, icon, still image, moving image, and text.

Meanwhile, the image display apparatus 100 may further include a photographing unit. The photographing unit may photograph a user. The photographing unit may be implemented with one camera, but is not limited thereto, and may be implemented with a plurality of cameras. Meanwhile, the photographing unit may be embedded in the image display apparatus 100 on the display 180 or may be separately disposed. Image information photographed by the photographing unit may be input to the controller 170.

The controller 170 may recognize a user's location, based on the image photographed by the photographing unit. For example, the controller 170 may determine a distance (z-axis coordinate) between the user and the image display apparatus 100. In addition, the controller 170 may determine the x-axis coordinates and the y-axis coordinates in the display 180 corresponding to the user location.

The controller 170 may detect a user's gesture based on the image photographed by the photographing unit, or each of signals detected by the sensor unit or a combination thereof.

When content is displayed through the display 180, the controller 170 may add information on the content displayed through the display 180 to the viewing history database stored in the storage unit 140. For example, the controller 170 may add a title, a genre, a content provider, a broadcasting time of the content, a broadcast channel on which the content is broadcast, an application in which the content is provided, a date when the content is uploaded to the application, and time in which the content is displayed through the display 180 to the viewing history database as information on the content.

In this situation, when the content is displayed for a predetermined time or longer, the controller 170 may add information on the content to the viewing history database. For example, if the user ends viewing the content before a predetermined time (e.g. 5 minutes) has elapsed from a point in time when the content is displayed on the display 180, information on the content may not be added to the viewing history database.

Meanwhile, when the content is displayed for less than a predetermined time, the controller 170 may display a message through the display 180 to guide the user to select whether the content is not preferred. In this situation, when the user selects that the content is not preferred, a history of the non-preference may be added to the viewing history database along with information on the corresponding content.

When the content is displayed through the display 180, the controller 170 may acquire an image (hereinafter, referred to as a surrounding image) of the surroundings of the image display apparatus 100 through a camera of the photographing unit and determine whether at least one object corresponding to the user is included in the acquired surrounding image. For example, the controller 170 may check at least one object included in the surrounding image and determine whether at least one object corresponding to the user is included by determining a type of the object. Here, the type of object may include an object corresponding to a user's face, an object corresponding to a background, an object corresponding to surrounding objects, and the like.

In this situation, the controller 170 may check features of the object corresponding to the user by using data, models, algorithms, etc. previously learned through machine learning such as deep learning. Here, machine learning means that a computer learns through data without instructing the computer to be directly instructed to logic, and through this, the computer solves a problem.

Deep learning is a method of teaching a computer the way of thinking of a person based on artificial neural networks (ANN), and it means an artificial intelligence technology that allows computers to learn like humans by themselves.

The artificial neural network (ANN) may be implemented in the form of software or may be implemented in the form of hardware such as a chip. For example, the artificial neural network (ANN) may include various types of algorithms such as a deep neural network (DNN), a convolutional neural network (CNN), Recurrent Neural Network (RNN) and Deep Belief Network (DBN).

When at least one object corresponding to the user is included in the surrounding image, the controller 170 may check features of the object corresponding to the user. Here, the features of the object corresponding to the user may include the user's gender and age.

In this situation, the controller 170 may add information on the content displayed through the display 180 to the viewing history database by mapping the feature of the object corresponding to the user. For example, when a male user in his 60s is located in front of the image display apparatus 100 while content is displayed through the display 180, the controller 170 may map information on the content (e.g. genre, content provider, etc.) and features of the user (e.g. gender, age, etc.), and add it to the viewing history database.

When at least one object corresponding to the user is included in the surrounding image acquired through the camera of the photographing unit, the controller 170 may check individual features of the object corresponding to the user. For example, the controller 170 may extract feature points from eyes, nose, mouth, etc. included in the user's face included in the surrounding image and check individual features of the user based on the extracted feature points.

The controller 170 may configure a database for each user based on features of the object corresponding to the user included in the surrounding image. For example, when a specific user is included in the surrounding image acquired through the camera of the photographing unit while a specific content is displayed through the display 180, the controller 170 may configure a database for each user by adding information on the specific content to a database for the specific user.

The controller 170 may perform an operation related to displaying content when a predetermined event related to a user's content viewing occurs. Here, the predetermined event may include reception of a control signal for executing an application related to content viewing from the remote control device 200 through the external device interface 130, reception of a voice related to content viewing through the microphone of the input unit 160, and the like.

The controller 170 may request and receive information on a plurality of receivable content from the at least one server 400 when the predetermined event related to the user's content viewing occurs. Here, the plurality of receivable content may include content corresponding to a broadcast signal receivable through the broadcast reception unit 105, web content receivable from a content provider or a network provider through the network interface 135, and the like.

Meanwhile, each of the at least one server 400 may respectively correspond to a content provider capable of providing broadcast content, web content, and the like to the image display apparatus 100. For example, each of the at least one server 400 may respectively correspond to a terrestrial broadcasting station, a satellite broadcasting station, a company providing an OTT service, etc.

The controller 170 may process the voice received through the microphone of the input unit 160, and may receive information on the plurality of receivable content from the server 400 based on a result of processing the voice. For example, when a voice including "show me sports" is input, the controller 170 may determine the meaning of "show me" and "sports", and may request and receive information on sports-related content from the server 400 through the network interface 135.

When the voice is received through the microphone of the input unit 160, the controller 170 may transmit data on the voice to the server 400 and receive data on a result of processing the voice from the server 400. For example, when the voice including "show me sports" is input, the controller 170 may transmit voice data including "show me sports" to the server 400 through the network interface 135. In this situation, the server 400 may process data on the voice to determine the meaning of "show me" and "sports", and transmit information on sports-related content to the image display apparatus 100.

When information on the plurality of receivable content is received from the server 400, the controller 170 may determine a priority for the plurality of receivable content based on the viewing history database stored in the storage unit 140. In this situation, the controller 170 may determine the priority for the plurality of receivable content using data, models, algorithms, etc. previously learned through the machine learning such as the deep learning.

For example, when information on sports-related content is received from the server 400, the controller 170 may check viewing frequency related to detailed genres of sports (e.g. baseball, soccer, basketball, etc.) based on the viewing history database, and determine the priority for the sports-related content received from the server 400 in the order of the detailed genres having a high viewing frequency. At this time, the controller 170 may extract content corresponding to a time when the predetermined event related to the user's content viewing occurs from the content included in the viewing history database, check the viewing frequency related to the detailed genre of sports with respect to the extracted contents, and determine the priority for the sports-related content received from the server 400 based on a result of checking the viewing frequency.

For example, when information on movie-related content is received from the server 400, the controller 170 may check viewing frequency related to content providers associated with a movie (e.g. Walt Disney Studios, Marvel Studios, Paramount Pictures, etc.) based on the viewing history database, and determine the priority for the movie-related content received from the server 400 in the order of the content providers having a high viewing frequency. At this time, the controller 170 may extract content whose viewing date is within a predetermined period (e.g. 3 months) from the content included in the viewing history database, check the viewing frequency related to the content providers associated with the movie with respect to the extracted contents, and determine the priority for the movie-related content received from the server 400 based on a result of checking the viewing frequency.

In determining the priority for the receivable content, the controller 170 may collectively determine a priority for all receivable content without distinguishing between content provision methods such as terrestrial broadcasting service, satellite broadcasting service, and OTT service, and generate a recommendation list for a plurality of receivable content according to the determined priority. That is, the priority for the receivable content are determined by comprehensively considering the user's viewing history of broadcast contents and/or web contents, and terrestrial broadcast content, satellite broadcast content, web content, and the like may be integrally included in the recommendation list regardless of the content provision method.

When the predetermined event related to the user's content viewing occurs, the controller 170 may acquire the surrounding image through the camera of the photographing unit and determine whether at least one object corresponding to the user is included in the acquired surrounding image.

When at least one object corresponding to the user is included in the surrounding image, the controller 170 may determine the priority for a plurality of receivable content based on features of the object corresponding to the user. For example, the controller 170 may check the number, gender, and age of objects corresponding to the user included in the surrounding image, and may determine the priority for the plurality of receivable content according to the check result.

In this situation, when a database about a specific user included in the surrounding image acquired through the camera of the photographing unit exists in the database for each user, the controller 170 may determine the priority for the plurality of receivable content based on information included in the database about a specific user. For example, the controller 170 may determine that the object is a first user, based on individual features of the object corresponding to the user included in the surrounding image. At this time, the controller 170 may check whether a database for the first user exists in the database for each user and determine the priority for the plurality of receivable content based on information included in the database for the first user when the database for the first user exists in the database for each user.

When information on the plurality of receivable content is received from the server 400, the controller 170 may check content providers of the plurality of receivable content and determine a content provider having the highest number of cumulative views among the checked content providers based on the viewing history database. In this situation, in determining the priority for the plurality of receivable contents, the controller 170 may determine a priority for content provided by the content provider having the highest number of cumulative views higher than priority for content of other content providers.

When the priority for the plurality of receivable content are determined, the controller 170 may display the recommendation list for the plurality of receivable content through the display 180 according to the determined priority. When displaying the recommendation list through the display 180, the controller 170 may display thumbnail images of content in the order of higher priority.

The controller 170 may display a thumbnail image with respect to a high ranked content having a relatively high priority among a plurality of content and display a preset basic image for remaining content except for the high ranked content. In this situation, when one of the basic images is selected by the user, the selected basic image may be changed and displayed as a thumbnail image of content corresponding to the selected basic image.

When displaying the recommendation list through the display 180, the controller 170 may display at least one item corresponding to an application related to the OTT service together with the recommendation list. Through this, the image display apparatus 100 may recommend an application related to the OTT service suitable for the user by comprehensively considering the user's viewing history of broadcast content and/or web content.

For example, when the content provider with the highest number of views among the content providers of the plurality of receivable content is Walt Disney Studios, the controller 170 may display an item (hereinafter referred to as recommendation item) corresponding to an application related to Walt Disney Studios (e.g. Hulu) together with the recommendation list.

For example, when the content provider with the highest number of views among the content providers of the plurality of receivable content is the Korean Broadcasting System (KBS), a terrestrial broadcasting station, the controller 170 may display a recommendation item corresponding to an application (e.g. Wavve) related to terrestrial broadcasting content together with the recommendation list.

In this situation, when the recommendation item is selected by the user, an application related to the content provider with the highest number of views corresponding to the recommended item may be executed, and content may be displayed using the application.

The power supply unit 190 may supply corresponding power throughout the image display apparatus 100. In particular, the power supply unit 190 may supply power to the controller 170 that can be implemented in the form of a System On Chip (SOC), the display 180 for displaying an image, the audio output unit 185 for outputting audio, and the like.

Specifically, the power supply unit 190 may include a converter for converting AC power into DC power, and a DC/Dc converter for converting the level of DC power.

The remote control device 200 may transmit a user input to the user input interface 150. To this end, the remote control device 200 may use Bluetooth, Radio Frequency (RF) communication, Infrared Radiation communication, Ultra-wideband (UWB), ZigBee, and the like. In addition, the remote control device 200 may receive an image, audio, or data signal output from the user input interface 150, and display it on the remote control device 200 or output as an audio.

Meanwhile, the above-described image display apparatus 100 may be a digital broadcast receiver capable of receiving a fixed or mobile digital broadcast.

Meanwhile, the block diagram of the image display apparatus 100 shown in FIG. 2 is just a block diagram for an embodiment of the present disclosure, and each component of the block diagram can be combined, added, or omitted in accordance with the specifications of the image display apparatus 100 that is actually implemented.

That is, if necessary, two or more components may be combined into a single component, or one component may be subdivided into two or more components. In addition, the functions performed in each block are for explaining the embodiment of the present disclosure, and a specific operation or device thereof does not limit the scope of the present disclosure.

Figure 3:
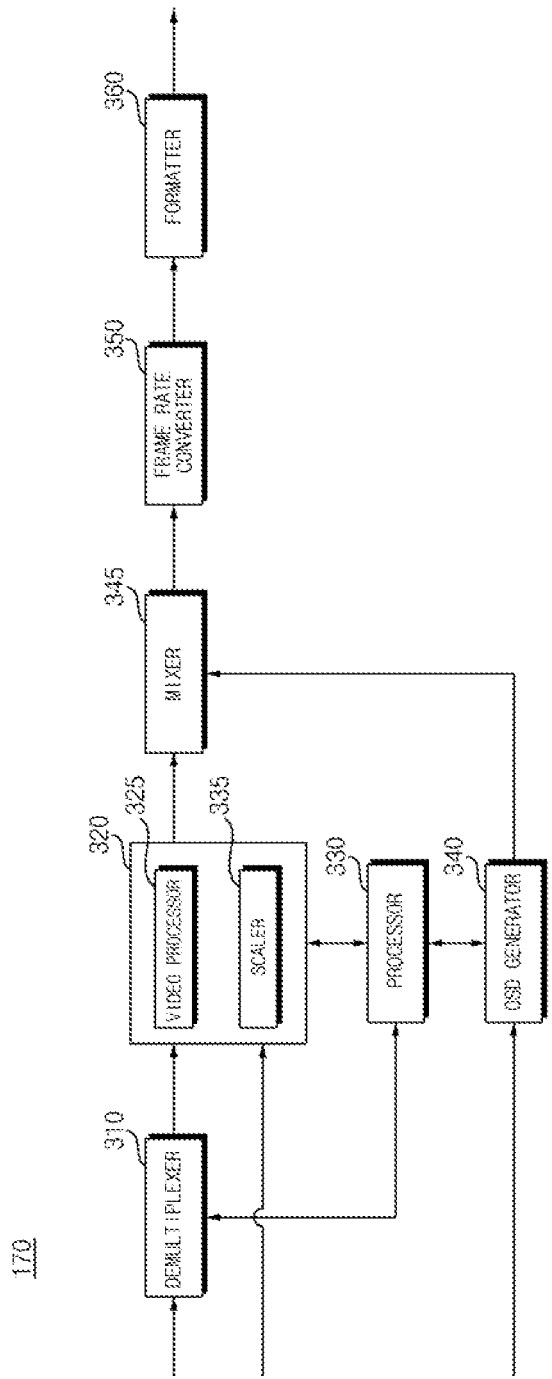
FIG. 3 is an internal block diagram of a controller of FIG. 2.

FIG. 3 is an internal block diagram of a controller of FIG. 2.

Referring to FIG. 3, the controller 170 according to an embodiment of the present disclosure may include a demultiplexer 310, an image processing unit 320, a processor 330, an OSD generator 340, a mixer 345, a frame rate converter 350, and/or a formatter 360. In addition, an audio processing unit and a data processing unit may be further included.

The demultiplexer 310 may demultiplex an input stream. For example, when an MPEG-2 TS is input, it can be demultiplexed and separated into image, audio, and data signal, respectively. Here, the stream signal input to the demultiplexer 310 may be a stream signal output from the tuner 110, the demodulation unit 120, or the external device interface 130.

The image processing unit 320 may perform image processing of the demultiplexed image signal. To this end, the image processing unit 320 may include an image decoder 325 and a scaler 335.

The image decoder 325 may decode the demultiplexed image signal, and the scaler 335 may perform scaling so that the resolution of the decoded image signal can be output from the display 180.

The image decoder 325 may include decoders of various standards. For example, the image decoder 325 may include an MPEG-2, H.264 decoder, a 3D image decoder for color image and depth image, a decoder for multiple view images, and the like.

The processor 330 may control overall operation within the image display apparatus 100 or within the controller 170. For example, the processor 330 may control the tuner 110 to select (tune) a broadcast corresponding to a channel selected by a user or a previously stored channel.

In addition, the processor 330 may control the image display apparatus 100 according to a user command input through the user input interface 150 or an internal program.

In addition, the processor 330 may control data transmission with the network interface 135 or the external device interface 130.

Further, the processor 330 may control operation of the demultiplexer 310, the image processing unit 320, and the OSD generator 340 in the controller 170.

The OSD generator 340 may generate an OSD signal by itself or according to a user input. For example, the OSD generator 340 may generate a signal for displaying various types of information on the screen of the display 180 as a graphic or text, based on a user input signal input through the input unit 160.

The generated OSD signal may include various data such as a user interface screen, various menu screens, widgets, icons, and the like of the image display apparatus 100. In addition, the generated OSD signal may include a 2D object or a 3D object.

In addition, the OSD generator 340 may generate a pointer that can be displayed on the display 180, based on a pointing signal input from the remote control device 200. The OSD generator 340 may include a pointing signal processing unit that generates a pointer. The pointing signal processing unit may not be provided in the OSD generator 340 and may be provided separately.

The mixer 345 may mix the OSD signal generated by the OSD generator 340 and the decoded image signal image-processed by the image processing unit 320. The mixed image signal may be provided to the frame rate converter 350.

The frame rate converter (FRC) 350 may convert a frame rate of an input image. Meanwhile, the frame rate converter 350 may output intactly without additional frame rate conversion.

The formatter 360 may arrange a left-eye image frame and a right-eye image frame of a frame rate-converted 3D image. In addition, the formatter 360 may output a synchronization signal Vsync for opening the left-eye glass and the right-eye glass of a 3D viewing device.

Meanwhile, the formatter 360 may convert the format of an input image signal into an image signal for display on the display 180 and output it.

In addition, the formatter 360 may change the format of the 3D image signal. For example, the formatter 360 may change the format of the 3D image signal into any one format among various 3D formats such as Side by Side format, Top/Down format, Frame Sequential format, Interlaced format, Checker Box format, and the like.

Meanwhile, the formatter 360 may convert a 2D image signal into a 3D image signal. For example, according to a 3D image generation algorithm, the formatter 360 may detect an edge or a selectable object in a 2D image signal, and separate and generate into a 3D image signal by the object according to the detected edge or the selectable object. At this time, the generated 3D image signal may be separated and arranged into a left-eye image signal L and a right-eye image signal R, as described above.

Meanwhile, although not shown in the drawing, after the formatter 360, a 3D processor for processing a 3-dimensional (3D) effect signal may be further disposed. Such a 3D processor may process brightness, tint, and color adjustment of an image signal in order to improve a 3D effect. For example, it is possible to perform signal processing, or the like to make the near clear and the far blurry. Meanwhile, the functions of the 3D processor may be merged into the formatter 360 or within the image processing unit 320.

Meanwhile, an audio processing unit in the controller 170 may perform audio processing of a demultiplexed audio signal. To this end, the audio processing unit may include various decoders.

In addition, the audio processing unit in the controller 170 may process a base, a treble, a volume control, and the like.

The data processing unit in the controller 170 may perform data processing of the demultiplexed data signal. For example, when the demultiplexed data signal is an encoded data signal, it may be decoded. The encoded data signal may be electronic program guide information including broadcasting information such as a start time and an end time of a broadcast program aired on each channel.

Meanwhile, the block diagram of the controller 170 shown in FIG. 3 is just a block diagram for an embodiment of the present disclosure, and each component of the block diagram may be integrated, added, or omitted according to the specifications of the actually implemented controller 170.

In particular, the frame rate converter 350 and the formatter 360 are not provided in the controller 170, but may be separately provided respectively or may be provided separately as a single module.

Figure 4:
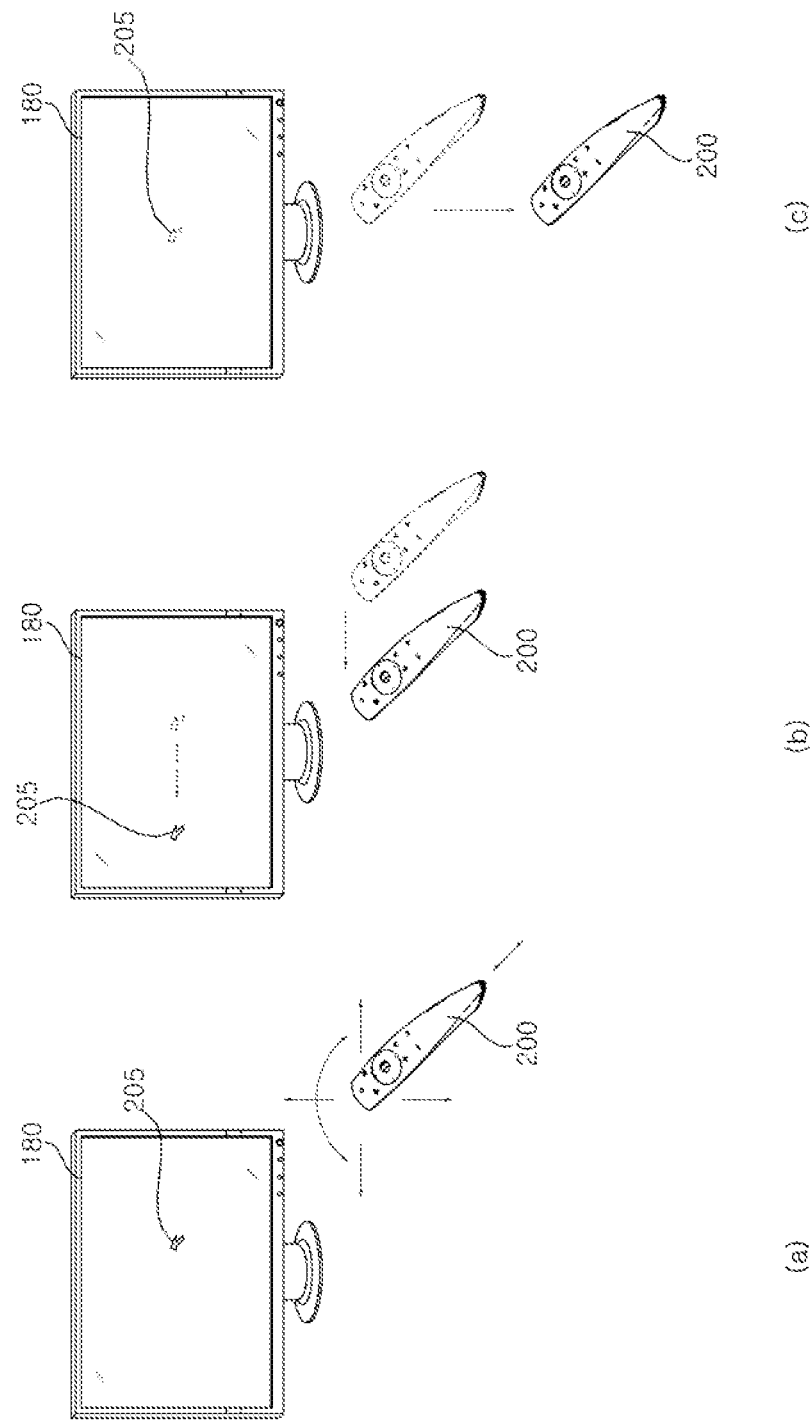
FIG. 4 is a diagram illustrating a control method of the remote control device of FIG. 2.

FIG. 4 is a diagram illustrating a control method of the remote control device of FIG. 2;

As shown in FIG. 4A, a pointer 205 corresponding to the remote control device 200 may be displayed on the display 180.

The user can move or rotate the remote control device 200 up and down, left and right (FIG. 4B), back and forth (FIG. 4C). The movement of the pointer 205 displayed on the display 180 of the image display apparatus may correspond to the movement of the remote control device 200. As shown in the drawing, the remote control device 200 may allow a corresponding pointer 205 to move and be displayed according to movement in a 3D space, and thus may be referred to as a space remote controller or a 3D pointing device.

FIG. 4B illustrates that when a user moves the remote control device 200 to the left, the pointer 205 displayed on the display 180 of the image display apparatus 100 also moves to the left in response thereto.

Information on the movement of the remote control device 200 detected through a sensor of the remote control device 200 may be transmitted to the image display apparatus 100. The image display apparatus 100 may calculate the coordinate of the pointer 205 from information related to the movement of the remote control device 200. The image display apparatus 100 may display a pointer 205 to correspond to the calculated coordinates.

FIG. 4C illustrates a case in which a user moves the remote control device 200 away from the display 180 while pressing a specific button in the remote control device 200. Accordingly, the selection area in the display 180 corresponding to the pointer 205 may be zoomed-in to be displayed in an enlarged manner. On the other hand, when the user moves the remote control device 200 closer to the display 180, the selection area in the display 180 corresponding to the pointer 205 may be zoomed-out to be displayed in a reduced size.

Meanwhile, when the remote control device 200 moves away from the display 180, the selection area may be zoomed-out, and when the remote control device 200 approaches the display 180, the selection area may be zoomed-in.

Meanwhile, when a specific button in the remote control device 200 is pressed, the image display apparatus 100 may exclude the determination of the up, down, left and right movements of the remote control device 200. That is, when the remote control device 200 moves away from or approaches the display 180, the up, down, left, and right movements are not determined, but only forward and backward movements may be determined. When a specific button in the remote control device 200 is not pressed, only the pointer 205 may be moved and displayed according to the up, down, left, and right movements of the remote control device 200.

Meanwhile, the moving speed or moving direction of the pointer 205 may correspond to the moving speed or moving direction of the remote control device 200.

Figure 5:
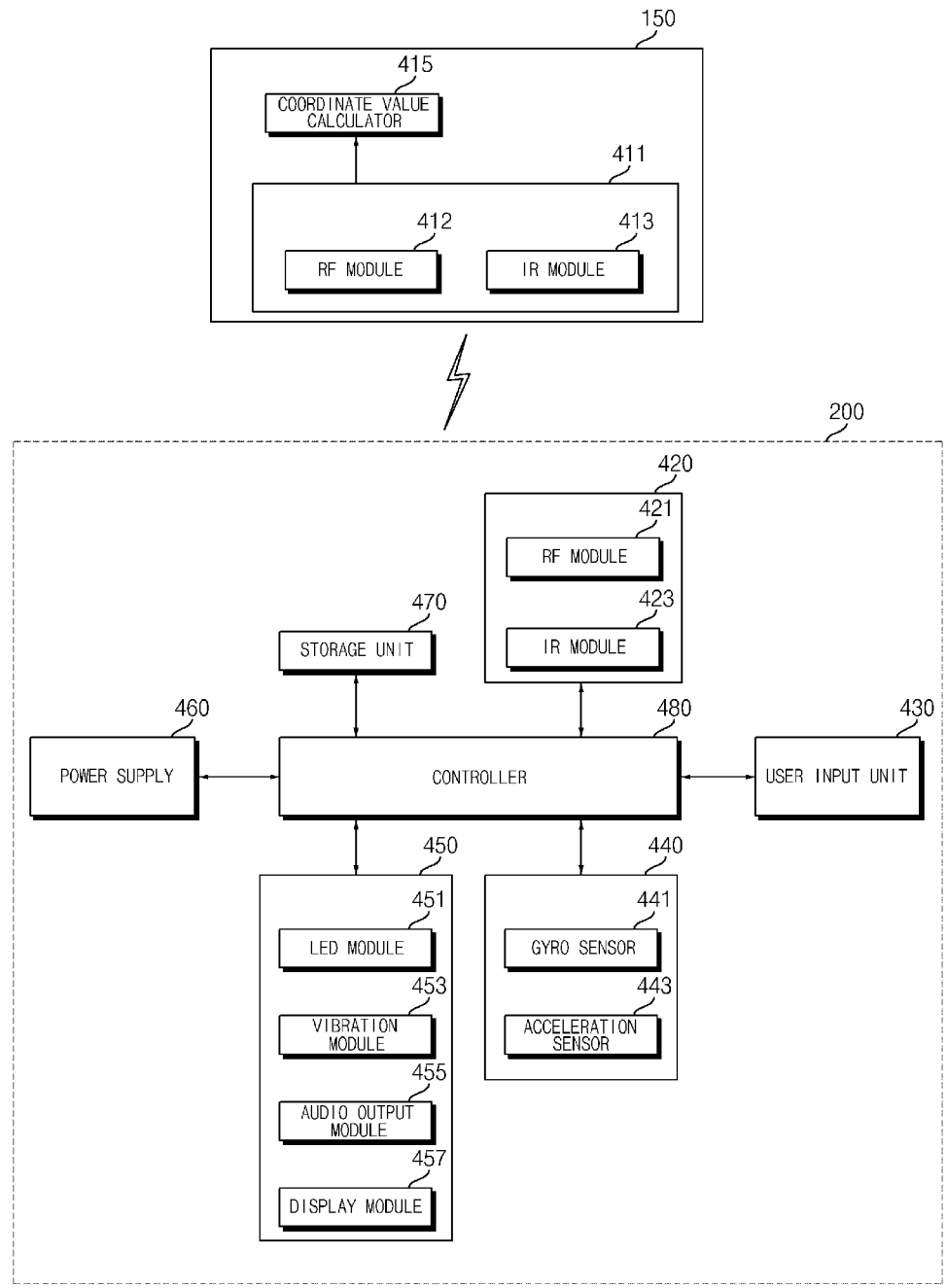
FIG. 5 is an internal block diagram of the remote control device of FIG. 2.

FIG. 5 is an internal block diagram of the remote control device of FIG. 2;

Referring to FIG. 5, the remote control device 200 may include a wireless communication unit 420, a user input unit 430, a sensor unit 440, an output unit 450, a power supply 460, a storage unit 470, and/or a controller 480.

The wireless communication unit 420 may transmit/receive a signal to/from any one of the image display apparatuses according to the embodiments of the present disclosure described above.

In the present embodiment, the remote control device 200 may include an RF module 421 for transmitting and receiving signals to and from the image display apparatus 100 according to a RF communication standard. In addition, the remote control device 200 may include an IR module 423 for transmitting and receiving signals to and from the image display apparatus 100 according to an IR communication standard.

The remote control device 200 may transmit a signal containing information on the motion of the remote control device 200 to the image display apparatus 100 through the RF module 421. The remote control device 200 may receive the signal transmitted by the image display apparatus 100 through the RF module 421.

The remote control device 200 may transmit a command related to power on/off, channel change, volume change, and the like to the image display apparatus 100 through the IR module 423.

The user input unit 430 may be implemented by a keypad, a button, a touch pad, a touch screen, or the like. The user may operate the user input unit 430 to input a command related to the image display apparatus 100 to the remote controller 200.

When the user input unit 430 includes a hard key button, the user can input a command related to the image display apparatus 100 to the remote control device 200 through a push operation of the hard key button.

When the user input unit 430 includes a touch screen, the user may touch a soft key of the touch screen to input the command related to the image display apparatus 100 to the remote controller 200.

In addition, the user input unit 430 may include various types of input means such as a scroll key, a jog key, etc., which can be operated by the user, and the present disclosure does not limit the scope of the present disclosure.

The sensor unit 440 may include a gyro sensor 441 or an acceleration sensor 443. The gyro sensor 441 may sense information on the motion of the remote controller 200.

The gyro sensor 441 may sense information on the operation of the remote control device 200 based on the x, y, and z axes. The acceleration sensor 443 may sense information on the moving speed of the remote controller 200. Meanwhile, a distance measuring sensor may be further provided, and thus, the distance to the display 180 may be sensed.

The output unit 450 may output an image or an audio signal corresponding to the operation of the user input unit 430 or a signal transmitted from the image display apparatus 100. Through the output unit 450, the user may recognize whether the user input unit 430 is operated or whether the image display apparatus 100 is controlled.

The output unit 450 may include an LED module 451 that is turned on when the user input unit 430 is operated or a signal is transmitted/received to/from the image display apparatus 100 through the wireless communication unit 420, a vibration module 453 for generating a vibration, an audio output module 455 for outputting an audio, or a display module 457 for outputting an image.

The power supply 460 may supply power to the remote controller 200. When the remote control device 200 is not moved for a certain time, the power supply 460 may stop the supply of power to reduce a power waste. The power supply 460 may resume power supply when a certain key provided in the remote control device 200 is operated.

The storage unit 470 may store various types of programs, application data, and the like necessary for the control or operation of the remote controller 200.

If the remote control device 200 wirelessly transmits and receives a signal to/from the image display apparatus 100 through the RF module 421, the remote control device 200 and the image display apparatus 100 transmit and receive a signal through a certain frequency band. The controller 480 of the remote control device 200 may store information on a frequency band or the like for wirelessly transmitting and receiving a signal to/from the image display apparatus 100 paired with the remote control device 200 in the storage unit 470 and may refer to the stored information.

The controller 480 may include at least one processor, and may control the overall operation of the remote control device 200 by using the processor included therein.

The controller 480 may transmit a signal corresponding to a certain key operation of the user input unit 430 or a signal corresponding to the motion of the remote control device 200 sensed by the sensor unit 440 to the image display apparatus 100 through the wireless communication unit 420.

The user input interface 150 of the image display apparatus 100 may include a wireless communication unit 411 that can wirelessly transmit and receive a signal to and from the remote control device 200 and a coordinate value calculator 415 that can calculate the coordinate value of a pointer corresponding to the operation of the remote controller 200.

The user input interface 150 may wirelessly transmit and receive a signal to and from the remote control device 200 through the RF module 412. In addition, the user input interface 150 may receive a signal transmitted by the remote control device 200 through the IR module 413 according to an IR communication standard.

The coordinate value calculator 415 may correct a hand shake or an error from a signal corresponding to the operation of the remote control device 200 received through the wireless communication unit 151 and calculate the coordinate value (x, y) of the pointer 205 to be displayed on the display 180.

The transmission signal of the remote control device 200 inputted to the image display apparatus 100 through the user input interface 150 may be transmitted to the signal processing unit 170 of the image display apparatus 100. The signal processing unit 170 may determine the information on the operation of the remote control device 200 and the key operation from the signal transmitted from the remote controller 200, and, correspondingly, control the image display apparatus 100.

For another example, the remote control device 200 may calculate the pointer coordinate value corresponding to the operation and output it to the user input interface 150 of the image display apparatus 100. In this situation, the user input interface 150 of the image display apparatus 100 may transmit information on the received pointer coordinate value to the signal processing unit 170 without a separate correction process of hand shake or error.

For another example, unlike the drawing, the coordinate value calculator 415 may be provided in the signal processing unit 170, not in the user input interface 150.

Figure 6:
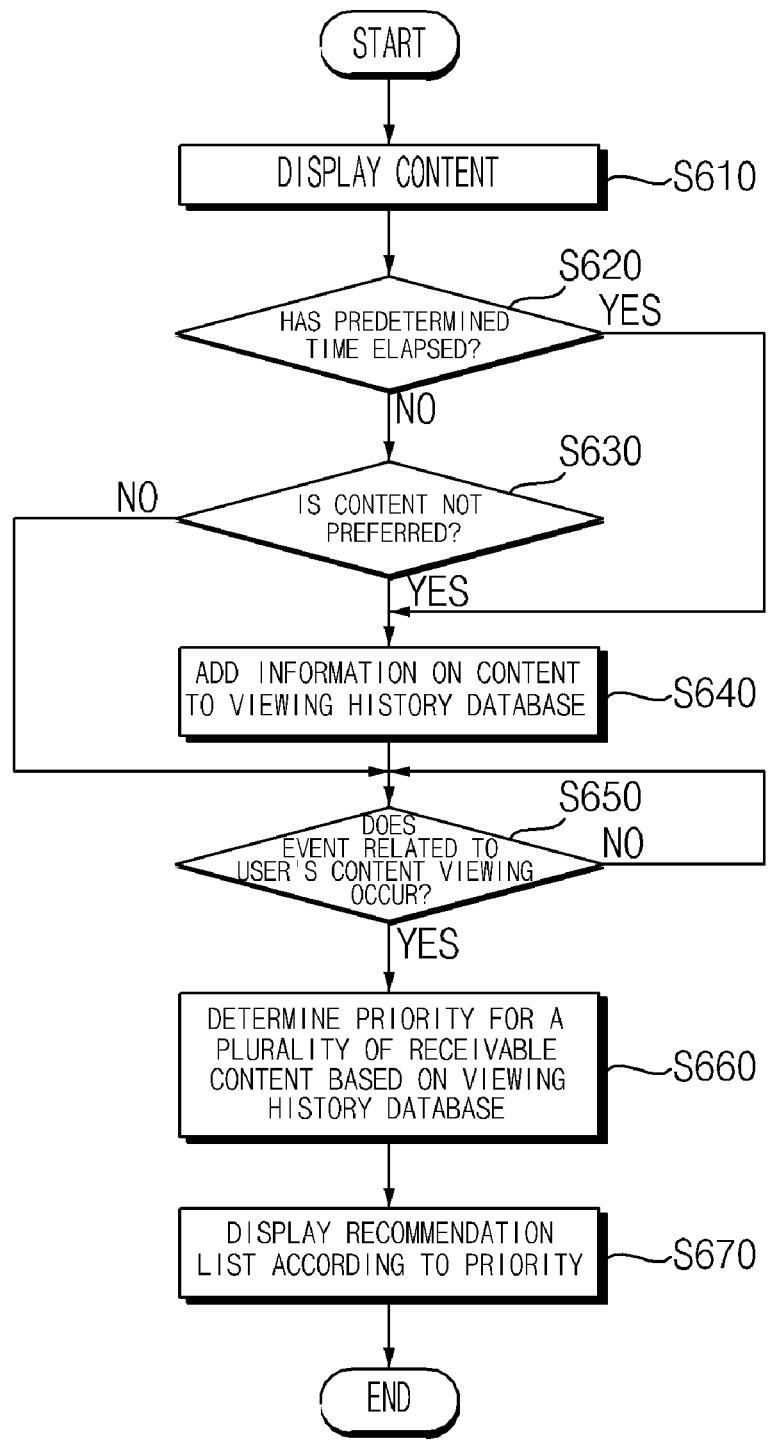
FIG. 6 is a flowchart illustrating a method of operating the image display apparatus according to an embodiment of the present disclosure.

FIG. 6 is a flowchart illustrating a method of operating the image display apparatus according to an embodiment of the present disclosure, and FIGS. 7 to 10C are diagrams referenced for explaining a method of operating the image display apparatus; and Referring to FIG. 6, in operation S610, the image display apparatus 100 may display content through the display 180. For example, the image display apparatus 100 may process a broadcast signal corresponding to a channel selected by a user among broadcast signals, and display content of the channel selected by the user. For example, the image display apparatus 100 may display content selected by a user from among web content provided through an application of a specific content provider.

Figure 7:
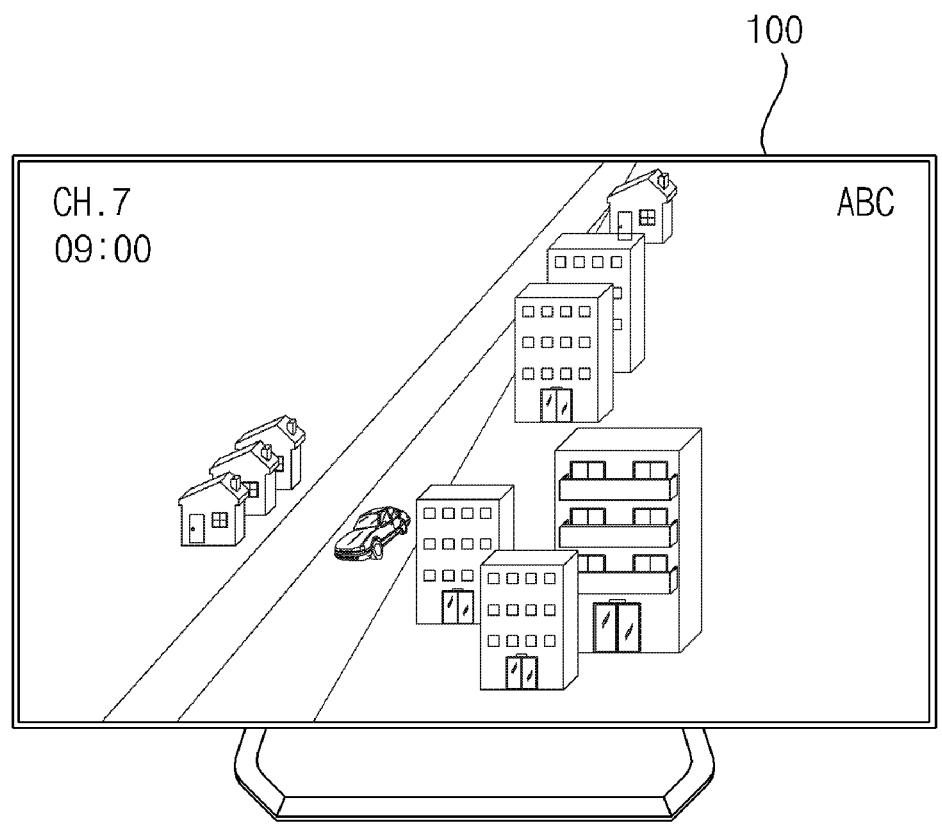
FIGS. 7-11 are diagrams referenced for explaining a method of operating the image display apparatus.

Referring to FIG. 7, the image display apparatus 100 may display content of channel 7 which is a channel selected by a user. In this situation, it can be confirmed that the content provider of the content 7 is an ABC broadcasting station, and the broadcasting time and the viewing time of the content are 9 am.

Referring to FIG. 6, in operation S620, the image display apparatus 100 may check whether a predetermined time (e.g. 5 minutes) has elapsed from a point in time when the content is displayed through the display 180.

In operation S630, when the user finishes viewing the content before the predetermined time (e.g. 5 minutes) elapses from the point in time when the content is displayed on the display 180, for example, when the user changes the channel, the image display apparatus 100 may display, through the display 180, a message guiding the user to select whether the content is not preferred.

In operation S640, when the content is displayed for the predetermined time (e.g. 5 minutes) or longer, the image display apparatus 100 may add information on the content to the viewing history database. For example, the image display apparatus 100 may add a title, a genre, a content provider, a broadcast channel on which the content is broadcast, a broadcasting time of the content, and a time in which the content is displayed through the display 180 to the viewing history database as information on the content.

Alternatively, in operation S640, when the content is displayed for less than a predetermined time (e.g. 5 minutes) and the user selects that the content is not preferred, the image display apparatus 100 may add a history of the non-preference and the information on the content to the viewing history database.

On the other hand, when the content is displayed for less than the predetermined time (e.g., 5 minutes) and the user does not select that the content is not preferred, the image display apparatus 100 may not add the information on the content to the viewing history database.

In operation S650, the image display apparatus 100 may check whether a predetermined event related to a user's content viewing occurs. For example, the image display apparatus 100 may check whether a control signal for executing an application related to content viewing is received from the remote control device 200 through the external device interface 130, and whether a voice related to content viewing is received through the microphone of the input unit 160.

In operation S660, when the predetermined event related to the user's content viewing occurs, the image display apparatus 100 may determine a priority for a plurality of content that can be received through at least one of the broadcast reception unit 105 and the network interface 135.

In operation S670, the image display apparatus 100 may display a recommendation list for the plurality of receivable content through the display 180 according to the priority for the plurality of receivable content.

Meanwhile, regarding the image display apparatus 100 determining the priority for the plurality of receivable content and displaying the recommendation list, a detailed description will be given with reference to FIGS. 8A to 10C.

Figure 8A:
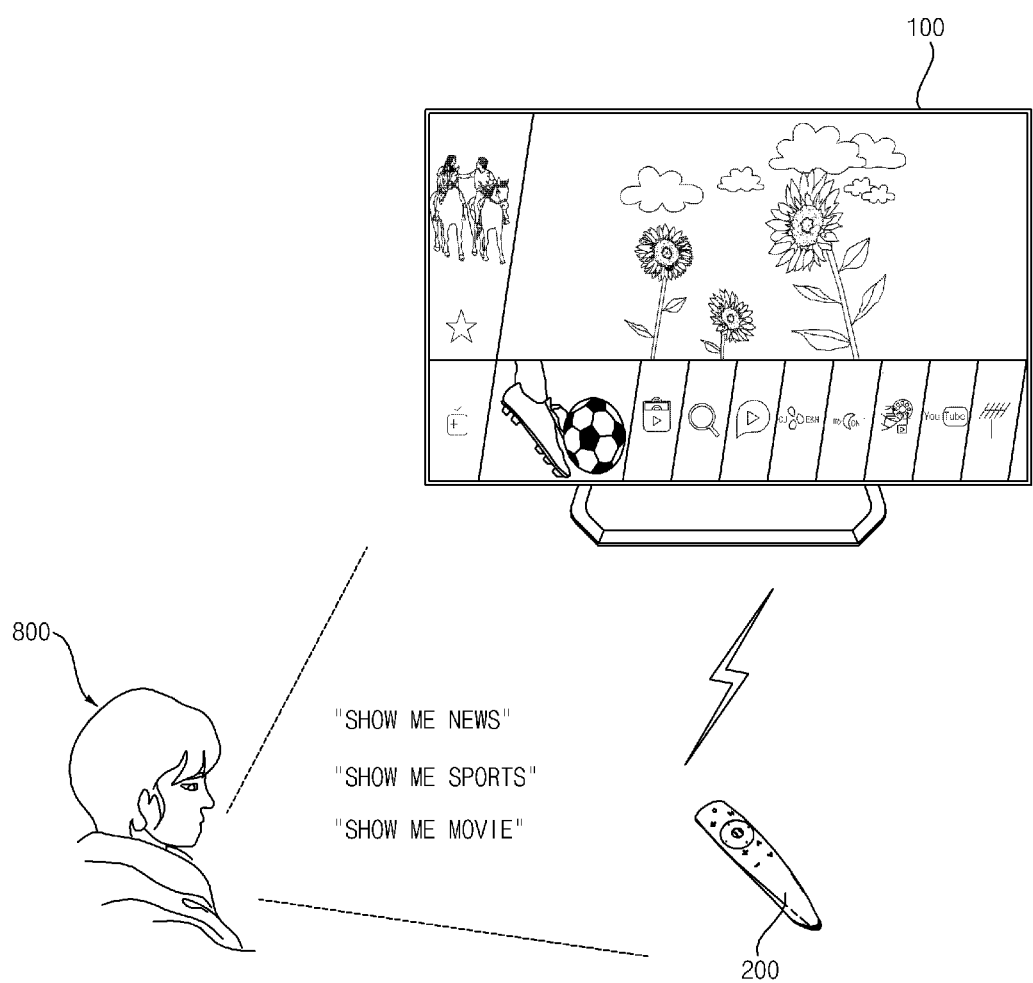

Referring to FIG. 8A, the image display apparatus 100 may receive a control signal for executing an application related to content viewing from the remote control device 200 or may receive a voice related to content viewing through the microphone.

For example, the user 800 may generate a predetermined event related to content viewing by uttering a voice including "show me news", "show me sports", and "show me a movie".

Figure 8B:
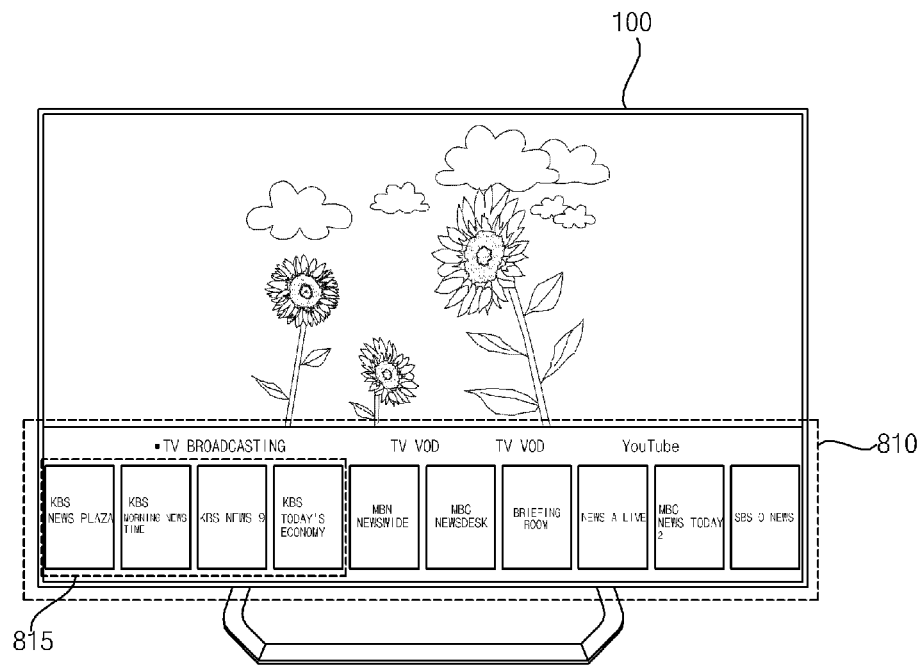

Referring to FIG. 8B, when the user 800 utters the voice including "show me news", the image display apparatus 100 may receive information on news-related content from the server 400.

The image display apparatus 100 may check information on news-related content included in the viewing history database, check broadcast channels or content providers of the news-related content watched by the user, and determine a priority for news-related content included in the information received from the server 400 in the order of broadcast channels or content providers having a high viewing frequency. For example, when news-related content provided by the KBS broadcasting station is watched most frequently, the priority for news-related content provided by the KBS broadcasting station may be determined higher than the priority for news-related content provided by another broadcasting station. Accordingly, when the user watches news-related content, thumbnail images 815 corresponding to the news-related content provided from the KBS broadcasting station may be preferentially displayed in the recommendation list 810.

Figure 8C:
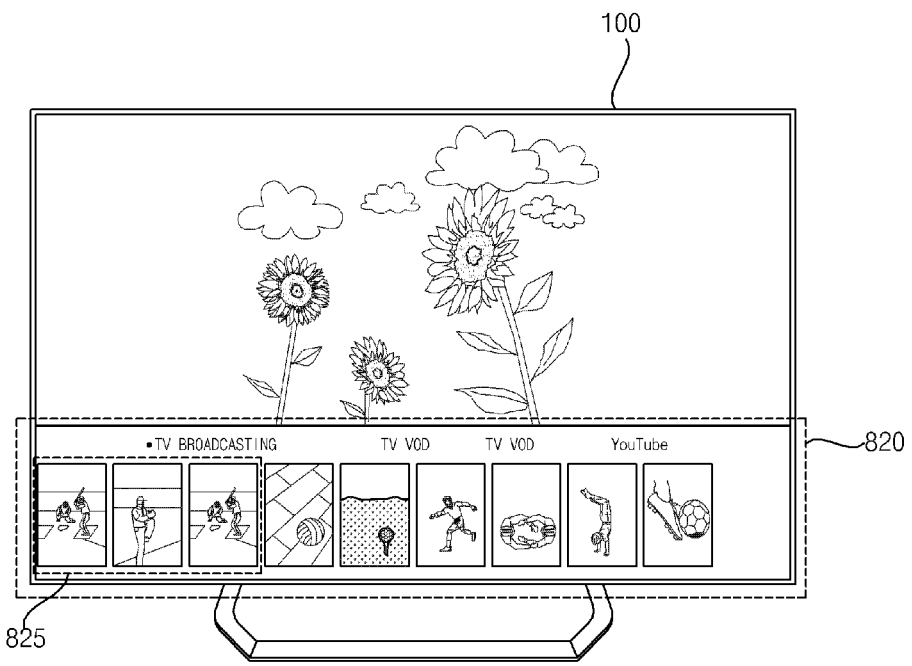

Referring to FIG. 8C, when the user 800 utters the voice including "show me sports", the image display apparatus 100 may receive information on sports-related content from the server 400.

The image display apparatus 100 may check information on sports-related content included in the viewing history database, check detailed genres or content providers of the sports-related content watched by the user, and determine a priority for sports-related content included in the information received from the server 400 in the order of detailed genres or content providers having a high viewing frequency. For example, when baseball-related content is watched most frequently, the priority for baseball-related content may be determined higher than that of other detailed genre content (e.g. soccer, basketball, etc.). Accordingly, when the user watches sports-related content, thumbnail images 825 corresponding to the baseball-related content may be preferentially displayed in the recommendation list 810.

Figure 9A:
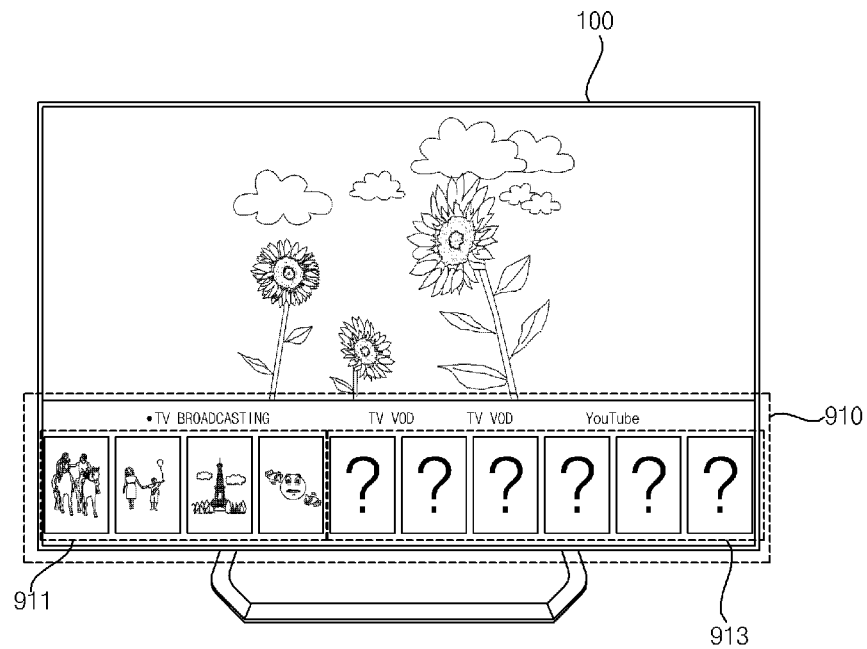
Figure 9B:
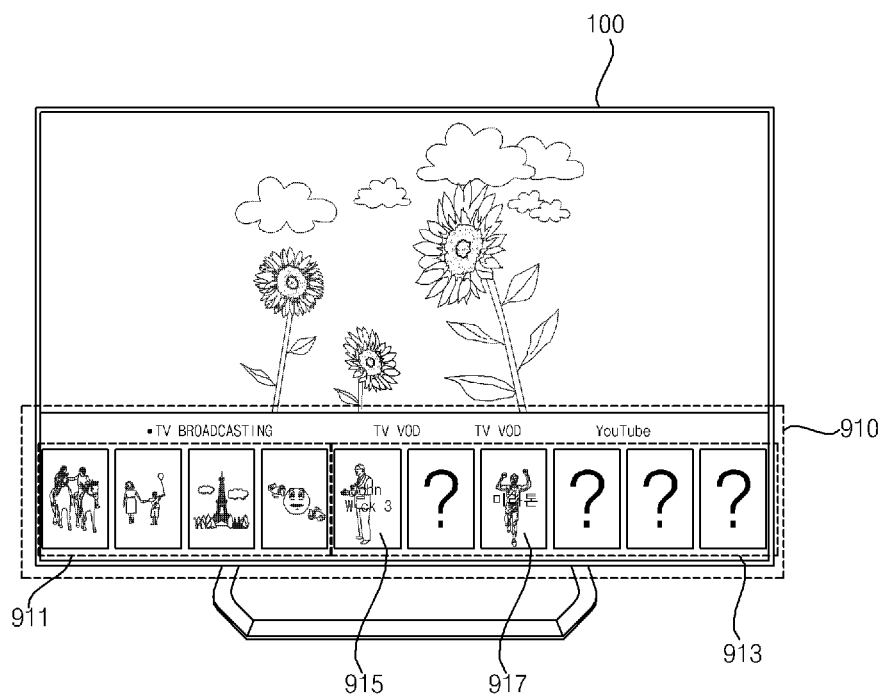

Meanwhile, referring to FIGS. 9A and 9B, when the user 800 utters a voice including "Show me movie", the image display apparatus 100 may receive information on movie-related content from the server 400.

The image display apparatus 100 may check information on movie-related content included in the viewing history database, check content providers of the movie-related content watched by the user, and determine a priority for movie-related content included in the information received from the server 400 in the order of content providers having a high viewing frequency. For example, when content from a specific content provider (e.g. Walt Disney Studios) is watched most frequently, the priority for the content from the specific content provider (e.g. Walt Disney Studios) may be determined higher than that of other content providers. Accordingly, when the user watches movie-related content, thumbnail images 825 corresponding to the specific content provider (e.g. Walt Disney Studios) may be preferentially displayed in the recommendation list 810.

In this situation, the image display apparatus 100 may display thumbnail images 911 with respect to the content of the specific content provider having a high priority and display preset basic images 913 with respect to content other than content from the specific content provider.

Meanwhile, when the user selects at least one of the preset basic images 913, the image display apparatus 100 may change and display the basic images selected by the user among the preset basic images 913 into thumbnail images 915 and 917 of content corresponding to the selected basic images.

In this way, by adjusting the number of content exposed through the recommendation list using the thumbnail image corresponding to the content and the preset basic image, it is possible to support the user's selection of content more quickly and accurately.

Figure 10A:
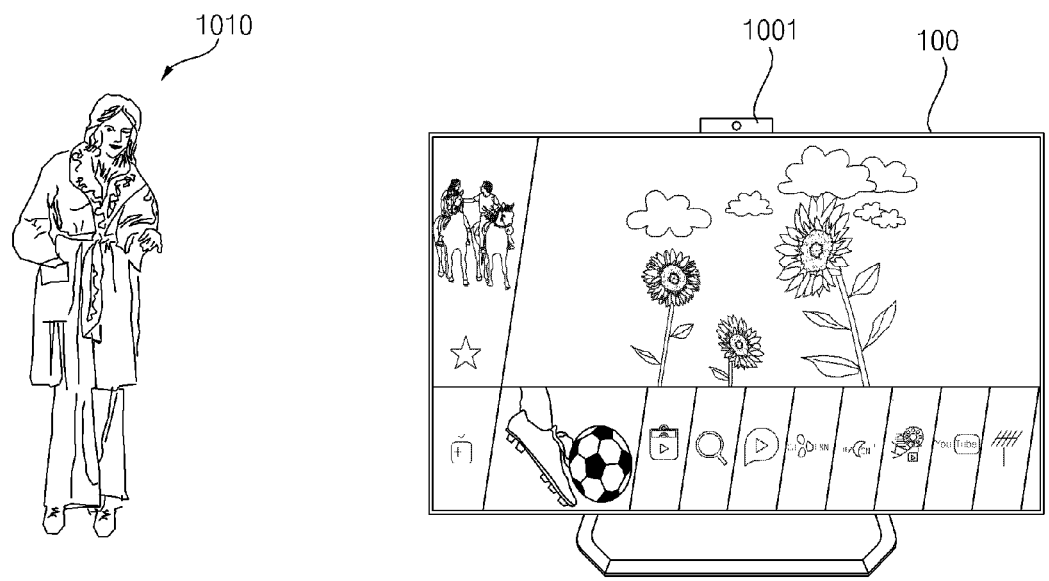
Figure 10B:
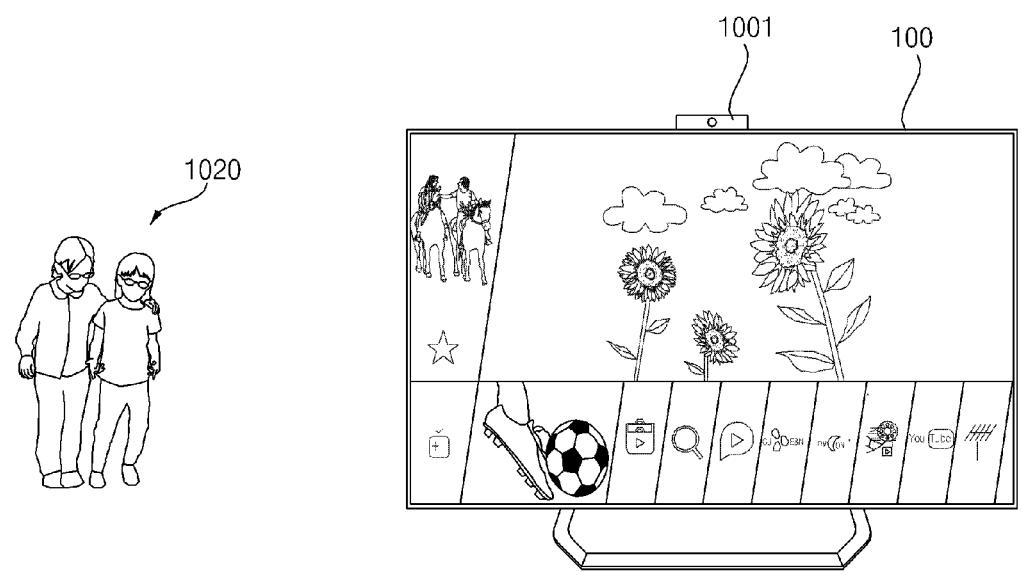
Figure 10C:
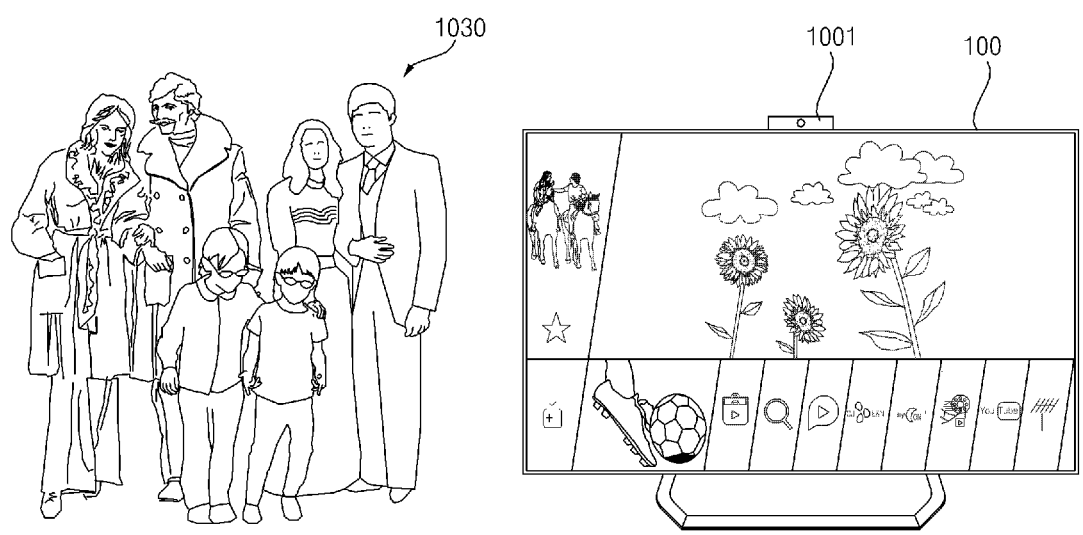

Referring to FIGS. 10A to 10C, when a predetermined event related to a user's content viewing occurs, the image display apparatus 100 may acquire a surrounding image through the camera of the photographing unit. In addition, when at least one object corresponding to a user is included in the acquired surrounding image, the image display apparatus 100 may determine a priority for a plurality of receivable content based on features of the object corresponding to the user.

Referring to FIG. 10A, when a female user in her late 50s 1010 is in front of the image display apparatus 100 when the predetermined event occurs (1010), the image display apparatus 100 may determine a priority for the plurality of receivable content in consideration of the fact that the user is a woman in her late 50s.

For example, the image display apparatus 100 may extract content mapped with features of the object corresponding to the user whose gender is female and their age is in their late 50s from among the content included in the viewing history database, and may determine a higher priority for specific content (e.g. daily drama) based on a genre, a content provider, and a viewing time of the extracted content.

Meanwhile, referring to FIG. 10B, when a male user and a female user 10 years or younger 1020 are in front of the image display apparatus 100 when the predetermined event occurs, the image display apparatus 100 may determine a priority for the plurality of receivable content in consideration of the fact that the users are children under the age of 10.

For example, the image display apparatus 100 may extract content mapped with features of the object corresponding to the users under the age of 10 from among the content included in the viewing history database, and may determine a higher priority for specific content (e.g. cartoon movie) based on a genre, a content provider, a viewing time, a content rating of the extracted content.

Meanwhile, referring to FIG. 10C, when a plurality of users 1030, from users under 10 to users over 60, are in front of the image display apparatus 100 when the predetermined event occurs, the image display apparatus 100 may determine a priority for the plurality of receivable content in consideration of various age groups of the plurality of users.

For example, when the sexes and ages of the plurality of users are various, the image display apparatus 100 may determine the priority for the plurality of content based on the genre, the content provider, the viewing time, the content rating of the content included in the viewing history database, and the like, regardless of the features of the object corresponding to the user.

For example, when the sexes and ages of the plurality of users are various, the image display apparatus 100 may extract content mapped with features of the object corresponding to a family user from among the content included in the viewing history database, and may determine a higher priority for specific content (e.g. documentary) based on a genre, a content provider, a viewing time, a content rating of the extracted content.

Meanwhile, in FIGS. 10A to 10C, when at least one object corresponding to the user is included in the acquired surrounding image, the image display apparatus 100 may extract feature points from eyes, nose, and mouth included in the face of an object corresponding to the user to check individual features. In this situation, when a database for a specific user corresponding to the identified individual features exists in the database for each user, the image display apparatus 100 may determine a priority for the plurality of receivable content based on information included in the database for the specific user.

Meanwhile, when the user 1100 generates a predetermined event related to content viewing while the pointer 205 corresponding to the remote control device 200 is displayed at a location corresponding to an application related to a specific OTT service, the image display apparatus 100 may a priority for the plurality of receivable content based on information included in a database for the specific OTT service among the databases.

Figure 11:
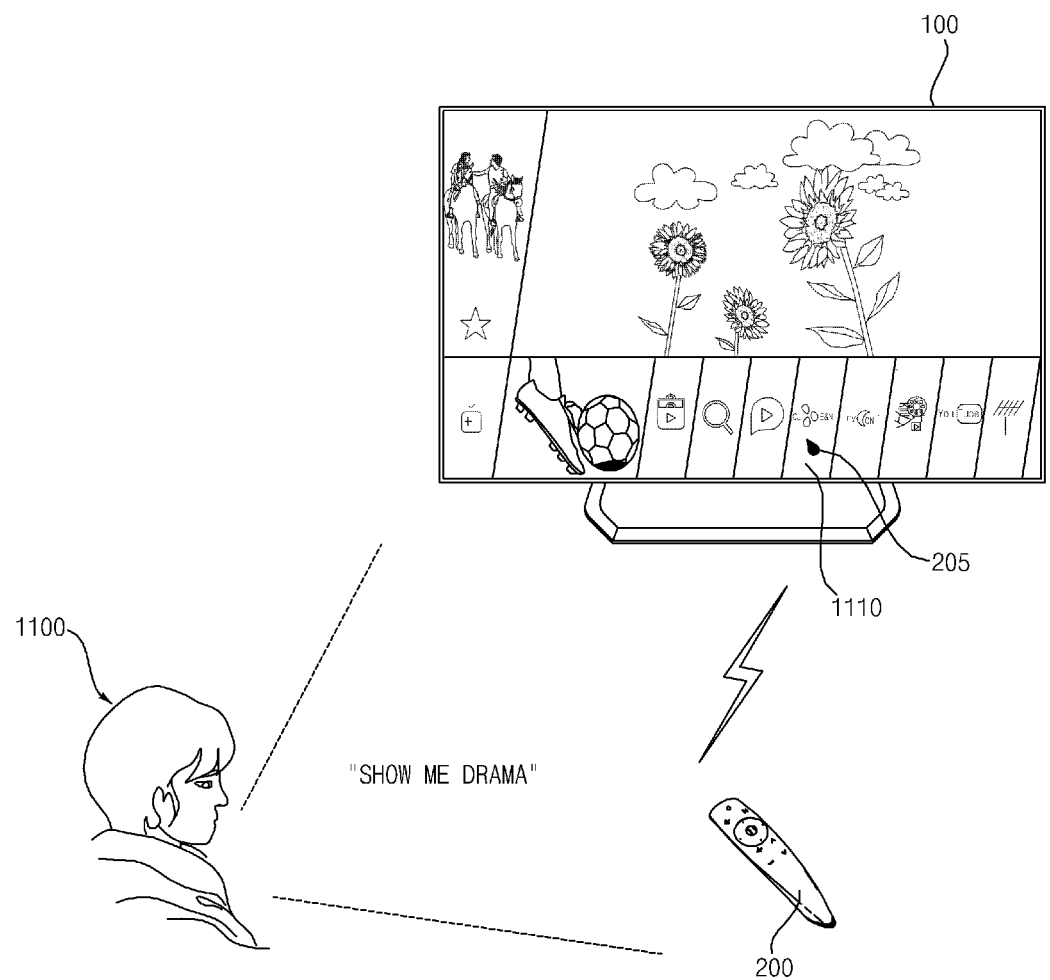

Referring to FIG. 11, when the user 1100 activates the microphone of the input unit 160 by manipulating a voice input key included in the user input unit 430 of the remote control device 200 and utters the voice including "show me drama" while the pointer 205 corresponding to the remote control device 200 is displayed at a location corresponding to the application 1110 related to a specific OTT service (e.g. CJ ENM), the image display apparatus 100 may receive information on drama-related content from the server 400.

In this situation, the image display apparatus 100 may check information on the drama-related content included in a database on the specific OTT service (e.g. CJ ENM), for example, broadcast channels or content providers of the drama-related content that the user watched through the specific OTT service (e.g. CJ ENM), and determine a higher priority in the order of broadcast channels or content providers with high viewing frequency.

According to the embodiments of the present disclosure, since content that is highly likely to be preferred by the user can be preferentially recommended in consideration of various recommendation factors such as a genre, a title, a channel, a viewing time, a content provider, and a content rating of content watched by a user through the image display apparatus 100, based on the user's viewing history, it is possible to improve user convenience regarding content selection.

In addition, according to the embodiments of the present disclosure, since information on content displayed in various ways through the image display apparatus 100 is collected and managed in an internal database of the image display apparatus 100, it is possible to recommend content that is highly likely to be preferred by a user, regardless of a user's login to a specific broadcast service or OTT service, without worrying about leakage of personal information.

In addition, according to the embodiments of the present disclosure, not only the user's viewing history, but also the user's characteristics using a camera included in the image display apparatus 100 can be checked, so that content suitable for each of a plurality of users can be recommended more quickly and accurately.

The accompanying drawings are used to assist in easy understanding of various technical features and it should be understood that the embodiments presented herein are not limited by the accompanying drawings. As such, the present disclosure should be construed to extend to any alterations, equivalents and substitutes falling within the spirit and scope of the present disclosure.

Meanwhile, an operating method of the server and the system including the same according to the present disclosure can be realized as a processor-readable code written on a recording medium readable by a processor included in the server and the system including the same. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. An image display apparatus comprising:
a display;
a network interface configured to communicate with a server;
a memory configured to store a viewing history database comprising information on content displayed through the display; and
a controller configured to:
based on a predetermined event related to a user's content viewing occurring, receive, from the server, information on each of a plurality of receivable content related to a first keyword corresponding to the predetermined event;
determine at least one content from among contents included in each of a plurality of viewing history sub-databases of the viewing history database, wherein the plurality of viewing history sub-databases comprises each of a genre viewing history sub-database, a content provider viewing history sub-database, a broadcast channel viewing history sub-database, a time period viewing history sub-database, a user viewing history sub-database and an over-the-top (OTT) viewing history sub-database, and wherein information on each of the at least one content is stored in the viewing history database and includes the first keyword;

determine a priority for the plurality of receivable content based on at least one second keyword included in both the information on each of the at least one content and the information on each of the plurality of receivable content;

display, through the display, a recommendation list for the plurality of receivable content according to the determined priority, wherein the displayed recommendation list for the plurality of receivable content includes recommended receivable content for each content provider of a set of content providers, the set of content providers including a broadcast channel provider, an OTT service provider, and a video-on-demand (VOD) service provider, and wherein, for each of the set of content providers, the displayed recommendation list includes at least one thumbnail image for a predetermined number of first content having a high priority among the plurality of receivable content and at least one preset image for second content other than the first content; and based on one of the at least one preset image being selected, change the selected preset image to a thumbnail image of content corresponding to the selected preset image.

2. The image display apparatus according to claim 1, wherein, based on content being displayed through the display, the controller is configured to add information on the content displayed through the display to the viewing history database;

wherein the information on the content includes at least one of a title, a genre, a content provider, a broadcast channel, an application, a provision date of the content, a broadcasting time of the content, and a viewing time of the content.

3. The image display apparatus according to claim 2, wherein the controller is configured to add the information on the content displayed through the display to the viewing history database based on the content being displayed for a predetermined time or longer.

4. The image display apparatus according to claim 1, further comprising a camera,
wherein the controller is configured to:
acquire a surrounding image associate with surroundings of the image display apparatus through the camera based on the predetermined event occurring; and
based on at least one object corresponding to a user being included in the acquired surrounding image, determine the priority for the plurality of receivable content based on features of the object corresponding to the user,
wherein the features of the object corresponding to the user include gender and age.

5. The image display apparatus according to claim 4, further comprising:
a camera,
wherein the controller is configured to:
control the camera to acquire the surrounding image based on content being displayed through the display;
map the information on the content displayed through the display with the features of the object corresponding to the user; and
add the mapped information to the viewing history database.

6. The image display apparatus according to claim 1, wherein the controller is configured to:
identify content providers of the plurality of receivable content based on the information on each of the plurality of receivable content;
determine, based on the information on each of the at least one content, a first content provider having the highest number of cumulative views among the identified content providers; and
determine a priority of content provided by the first content provider higher than that of other content providers.

7. The image display apparatus according to claim 6, wherein the controller is configured to:
display, through the display, an item corresponding to an application related to the first content provider together with the recommendation list; and
execute the application related to the first content provider based on the item being selected.

8. A method of an image display apparatus, the method comprising:
based on a predetermined event related to a user's content viewing occurring, receiving information on each of a plurality of receivable content from a server through a network interface of the image display apparatus,
wherein each of the plurality of receivable content is related to a first keyword corresponding to the predetermined event;
determining at least one content from among contents included in each of a plurality of viewing history sub-databases of a viewing history database stored in a memory of the image display apparatus,
wherein the plurality of viewing history sub-databases comprises each of a genre viewing history sub-database, a content provider viewing history sub-database, a broadcast channel viewing history sub-database, a time period viewing history sub-database, a user viewing history sub-database and an over-the-top (OTT) viewing history sub-database, and
wherein information on each of the at least one content stored in the viewing history database includes the first keyword;
determining a priority for the plurality of receivable content based on at least one second keyword included in both the information on each of the at least one content and the information on each of the plurality of receivable content;
displaying, through a display of the image display apparatus, a recommendation list for the plurality of receivable content according to the determined priority,
wherein the displayed recommendation list for the plurality of receivable content includes recommended receivable content for each content provider of a set of content providers, the set of content providers including a broadcast channel provider, an OTT service provider, and a video-on-demand (VOD) service provider, and
wherein, for each of the set of content providers, the displayed recommendation list includes at least one thumbnail image for a predetermined number of first content having a high priority among the plurality of receivable content and at least one preset image for second content other than the first content; and
based on one of the at least one preset image being selected, changing the selected preset image to a thumbnail image of content corresponding to the selected preset image.

* * * * *